(No Model.) 3 Sheets—Sheet 1.
O. BRYANT & E. RING.
MACHINE FOR THE MANUFACTURE OF WHIP STOCKS, &c.
No. 318,348. Patented May 19, 1885.
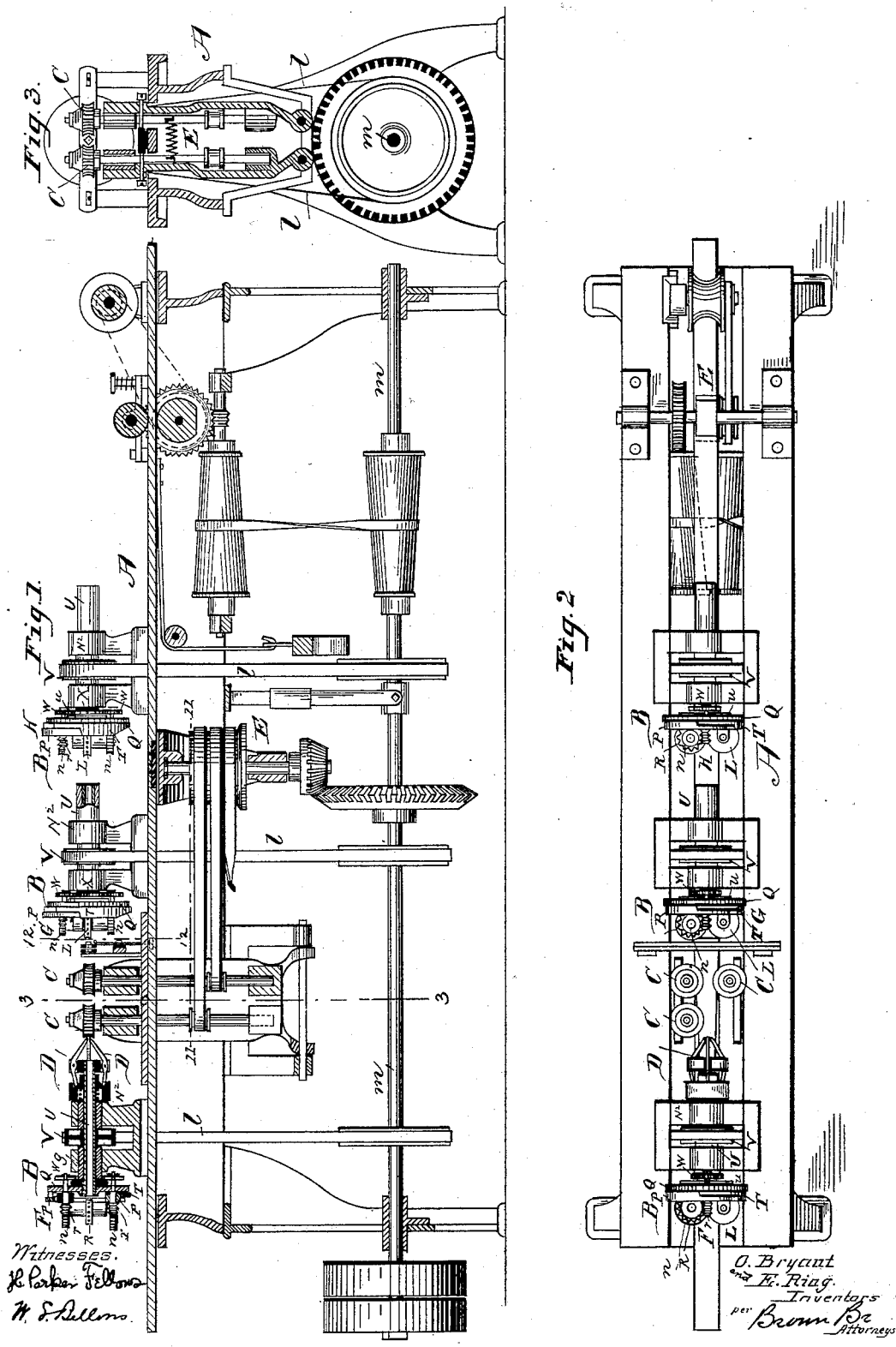

(No Model.) 3 Sheets—Sheet 2.
O. BRYANT & E. RING.
MACHINE FOR THE MANUFACTURE OF WHIP STOCKS, &c.
No. 318,348. Patented May 19, 1885.
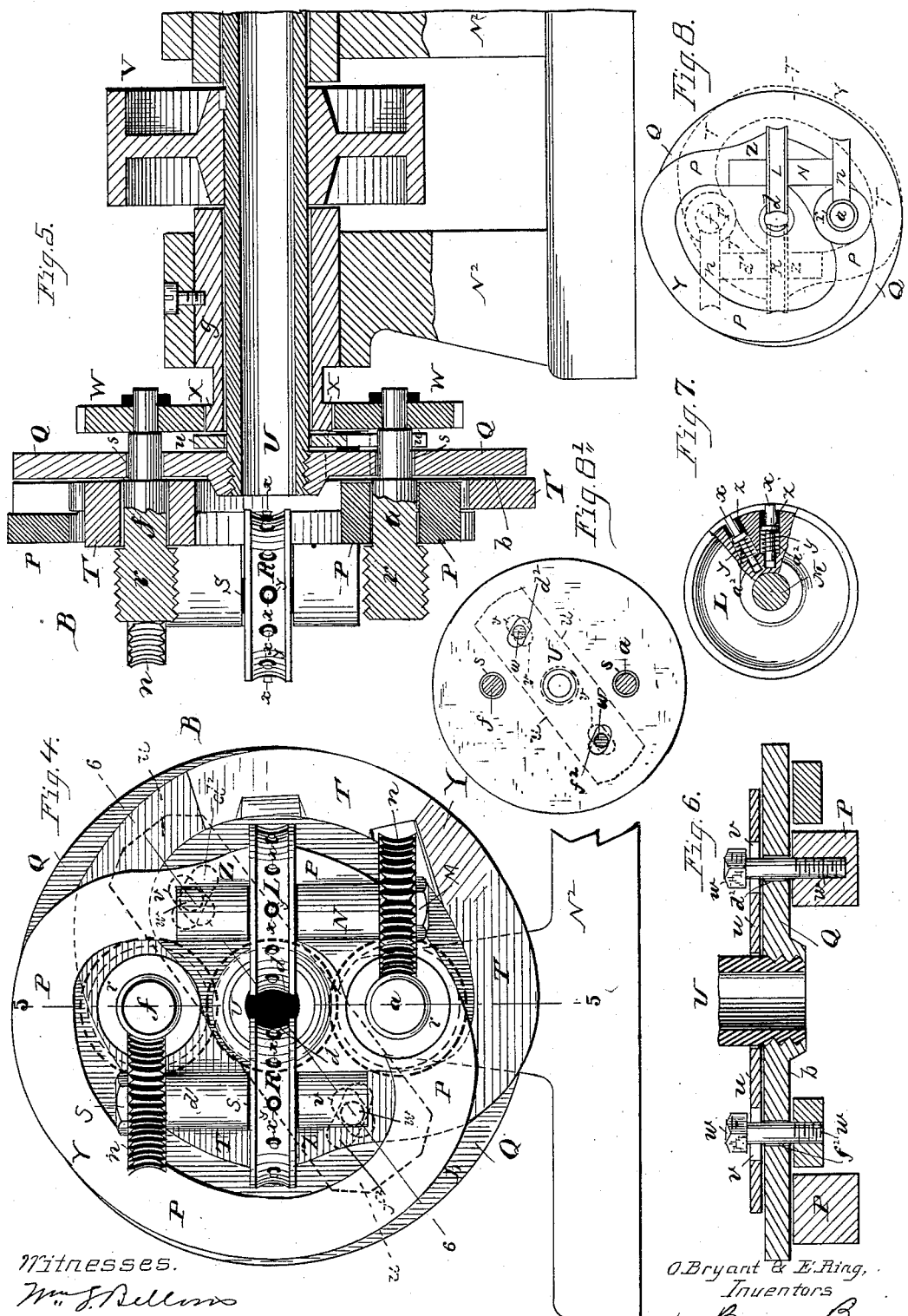
O. Bryant & E. Ring,
Inventors
per Brown Bros.
Attorneys (No Model.) 3 Sheets—Sheet 3.
O. BRYANT & E. RING.
MACHINE FOR THE MANUFACTURE OF WHIP STOCKS, &c.
No. 318,348. Patented May 19, 1885.
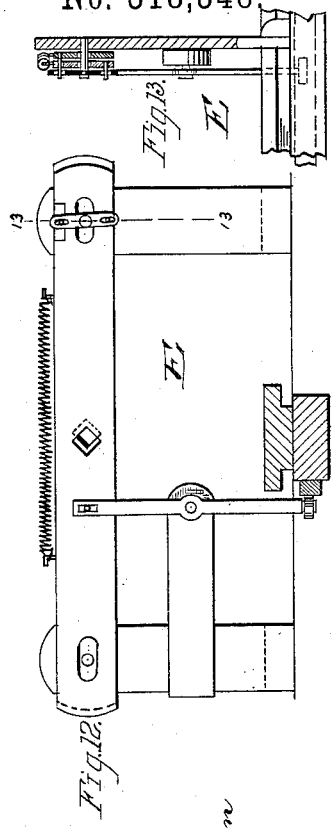
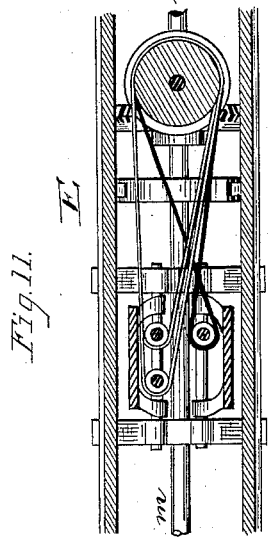
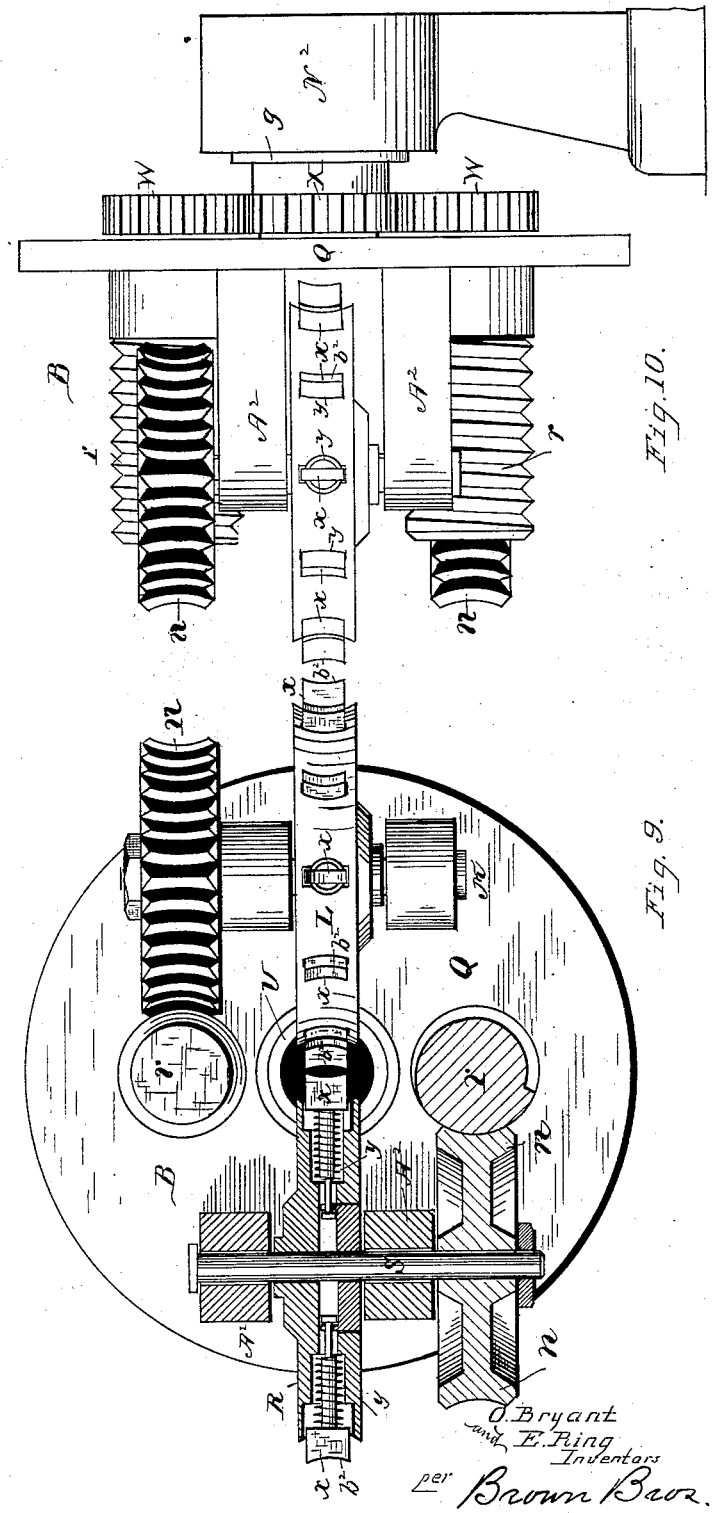

UNITED STATES PATENT OFFICE.

ORRIN BRYANT AND ELKANAH RING, OF WESTFIELD, MASSACHUSETTS.

MACHINE FOR THE MANUFACTURE OF WHIP-STOCKS, &c.

SPECIFICATION forming part of Letters Patent No. 318,348, dated May 19, 1885.

Application filed July 19, 1884. (No model.)

*To all whom it may concern:*

Be it known that we, ORRIN BRYANT and ELKANAH RING, of Westfield, in the county of Hampden and State of Massachusetts, have invented certain new and useful Improvements in Machines for the Manufacture of Whip-Stocks, of which the following is a full, clear, and exact description.

This invention relates to improvements in the manner of feeding whip-stocks, more particularly, to and through a machine in which are arranged cutters to cut and trim the stock to the proper shape and size desired for the whip; and the invention consists, in combination with a disk or plate adapted to be revolved in any suitable manner, of feed-rolls arranged to revolve in suitable bearings on said disk at right angles thereto by and because of the rotation of said disk to feed the whip-stock to the cutting and trimming tools and through the machine, all substantially as hereinafter described.

The invention also consists, in combination with a disk or plate adapted to be revolved in any suitable manner, of arms pivoted to a face of the same, and carrying suitable feed-rolls engaging with suitable driving mechanism, and constructed and arranged so that as the disk or plate is revolved each arm will be swung on its pivot from the centrifugal force exerted thereon, and in such manner that the portion of the arm to which its feed-roll is attached will, with such feed-roll, be moved toward the central axial line of said disk for the feed-rolls to grasp and hold the central axial line of said disk, and thus grasp between their peripheries the whip-stock, and feed the same to the cutting or trimming tools and through the machine, all substantially as hereinafter fully described.

It also consists in the construction and arrangement of other parts in connection therewith, hereinafter fully described.

In the accompanying plates of drawings this invention is illustrated: In Plate 1, Figure 1 is a side view of a machine for cutting and trimming whip-stocks having this invention applied thereto. Fig. 2 is a plan view of Fig. 1. Fig. 3 is a vertical cross-section on line 3 3, Fig. 1. In Plate 2, Fig. 4 is a front view of the present invention consisting of the disk or plate carrying its swinging arms and feed-rolls. Fig. 5 is a longitudinal section on line 5 5, Fig. 4. Fig. 6 is a section on line 6 6, Fig. 4, and Fig. 7 a detail view. Figs. 8 and 8' are detail views to be hereinafter referred to. In Plate 3, Fig. 9 is a partial front view and partial section of the disk and its feed-rollers; Fig. 10, a side view of Fig. 9; Fig. 11, a detail sectional view on line 11 11, Fig. 1; Fig. 12, a detail sectional view on line 12 12, Fig. 1. Fig. 13 is a detail section on line 13 13, Fig. 12.

In the drawings, Plate 1, A represents a machine for cutting and trimming whip-stocks, in which B is the feed-roller mechanism for feeding the whip-stock to and through the machine, C the cutters, D the spring-fingers, and E other parts of the machine, all constructed and arranged as usual in such machines, and needing no particular description herein, except as to the present invention.

The feed-roll mechanism B, of which there are three, F G H, shown in the drawings, is constructed and arranged for operation substantially as follows: The first one, F, receives the whip-stock in the rough state and feeds it to the cutters C, and the ones G and H continue such feed through the rest of the machine, each being caused to revolve and operate the same, the description of one answering for all.

L is a roll secured to a shaft, M, which shaft is arranged to turn in suitable bearings, N, upon an arm, P, pivoted at *a* to the disk Q on its side *b*, the roll being arranged to revolve in a plane perpendicular to the side *b* of the disk, and the arm so arranged that the periphery of said roll at one side, *d*, will be near or at the central axial line of said disk.

R is a similar roll arranged to turn by its shaft S in suitable bearing, *d'*, on arm T, similar to arm P, and pivoted at *f* to the side *b* of the disk, diametrically opposite to the pivot *a* of the arm P, this arm T carrying its roll R so as to be opposite to the roll L, as shown in Fig. 4 more particularly, and for their peripheries to be adjacent to each other to be at or near the central axial line of the disk. The arms P and T are so arranged on the disk as to move by each other without interfering, the arm T passing under arm P, between it and the disk Q. The disk Q is attached to one end of a tubular horizontal shaft, U, which is arranged to turn in suitable bearings, $g$, in the frame-work $N^2$ of the machine.

V is a pulley on shaft U, connected by driving-belt $l$ to the main shaft $m$ of the machine, by which it is revolved, turning the disk with its arms and rolls.

On the end of each shaft M S of each roll is a worm-gear, $n$, which engages with a worm, $r$, upon pivots $a f$ of its respective arm. These pivots are arranged to turn in bearings $s$ in the disk Q, and projecting through the same, and each having on its outer end a gear-wheel, W, arranged to engage with a stationary gear-wheel, X, attached to the bearing $g$, in which the shaft U turns. Revolving the shaft U turns the disk Q, and carrying with it the arms P T and their feed-rolls L R and the gear-wheels W, which gear-wheels, as they are revolved around the stationary gear-wheel X, are caused to revolve on their own axes, and in turn, through their worm-gearing connection with the feed-rolls, cause said feed-rolls to turn, and in such direction that if a whip-stock is placed between them it will be fed through the tubular shaft U to the cutters for their operation thereon, the revolving of the disk also causing the whip-stock to revolve at the same time.

The arms P and T are constructed and arranged as described, for the centrifugal force exerted thereon when the disk is revolved to cause the portion Z of the arms to which the feed-rolls are attached to move toward the central axial line of the disk for the feed-rolls to firmly grip the whip-stock between them and feed it through the machine. Such movements of the arms are secured because each arm is weighted at its portion Y, and such portion is at a greater radial distance from the central axial line of the disk than the portion Z of the arm on which the feed-roll is attached, and is also diametrically opposite to, or substantially diametrically opposite to, such portion Z, whereby as the disk is revolved the centrifugal force exerted on each arm will be greater on its portion Y than on its portion Z, where the feed-roll is attached, and thus the portion Y will be moved outward, or away from the central axial line of the disk, causing the portion Z of the arm where the feed-roll is attached to move inward or toward the central axial line of the disk, and with a force corresponding to the speed with which the disk is revolved.

To equalize the movements of the arms so that the feed-rolls will be moved toward each other with the same force and with the same distance in the same time for the whip-stock to be held in the central axial line of the disk and shaft for the true operation of the cutters thereon, a flat bar, $u$, on the back side of the disk Q, is arranged to turn freely on said shaft U, and it is connected by each end to the arms T P by central longitudinal slots, $v$, playing over screw-pins $w$, screwing into each arm P T, and passing through curved slots $d^2$ and $f^2$ in the disk, concentric with the pivots $a f$ respectively. As the arms revolve with the disk this plate is carried with them, and by its connection with the shaft U, and its slot-connection $v$ with the arms, the movements and force of the two arms are controlled so as to be equalized and balanced for the purpose stated.

In the periphery of each feed-roll L P are studs $x$, arranged at equal distances apart, and to move in radial slots $y$ in the roll, and being held from escape by shoulders $z$, being held against such shoulders by spiral springs $a^2$, as shown more particularly in Fig. 7, Plate 2. These studs project a short distance beyond the periphery of the roll and bear upon the whip-stock, in the operation of the machine, with an elastic and yielding pressure.

In Figs. 9 and 10 are shown the feed-rolls L R as secured to shafts M S, which turn in fixed bearings $A^2$ on the outer face of the disk, the arms T P being dispensed with and the rolls depending for their hold upon the whip-stock by the spring-studs $x$, which in this case are broader, as shown, and have their outer bearing-surfaces, $b^2$, more or less concave.

The feed-rolls are revolved by the worm-gearing connection in the same manner as described.

This invention is applicable to other machines where it is desired to feed material to be cut and turned, &c., as well as to whip-stock machines.

The bar $u$, in lieu of being arranged to turn on the disk-shaft U, can be arranged to turn independently thereof in any suitable manner, although it should be arranged to turn concentrically therewith, but arranged as described is satisfactory and preferable. The bar also can be connected to the arms P T in any suitable manner than as described.

Having thus described our invention, what we claim, and desire to secure by Letters Patent, is—

1. In a machine for cutting and trimming whip-stocks, &c., feed-rolls arranged to turn in suitable bearings, each upon a separate arm pivoted to the face or side of a disk or plate constructed and arranged to revolve in any suitable manner, each arm being pivoted to such disk at a point midway between its center and circumference, and curved around its center of rotation, a portion, Y, of each arm being weighted, and diametrically or substantially diametrically opposite to and at a greater radial distance from the central axial line of said disk than that portion Z of said arm on which its roll is attached, substantially as and for the purpose specified.

2. In a machine for cutting and trimming whip-stocks, &c., feed-rolls arranged to turn in suitable bearings, each upon a separate arm pivoted to the face or side of a disk or plate constructed and arranged to revolve in any suitable manner, each arm being pivoted to such disk at a point midway between its center and circumference, and curved around its center of rotation, a portion, Y, of each arm being weighted, and diametrically or substantially diametrically opposite to and at a greater radial distance from the central axial line of said disk than that portion Z of said arm on which its roll is attached, in combination with a bar or plate, $u$, arranged to turn upon the shaft, or concentrically with said disk, and connected to said arms for operation thereon, substantially as and for the purpose specified.

3. In a machine for cutting and trimming whip-stocks, &c., feed-rolls arranged to turn in suitable bearings, each upon a separate arm pivoted to the face or side of a disk or plate constructed and arranged to revolve in any suitable manner, a portion, Y, of each arm being weighted, and diametrically or substantially diametrically opposite to and at a greater radial distance from the center of rotation of said disk than that portion Z of said arm on which its roll is attached, in combination with a bar or plate, $u$, attached to said arms by a pin, $w$, and slot $v$, connected and arranged to turn upon the shaft of or concentrically with said disk, said pins $w$ passing through slots $d^2$ and $f^2$, respectively, in said disk, substantially as and for the purpose specified.

4. In a machine for cutting and trimming whip-stocks, &c., feed-rolls arranged to turn in suitable bearings, each upon a separate arm pivoted to a revolving disk, the shaft of each roll being provided with a worm-gear engaging with a worm on the pivot of its arm, each pivot having a gear-wheel, W, engaging with a stationary gear-wheel, X, upon the frame, substantially as and for the purpose specified.

5. A disk or plate, Q, constructed and arranged to revolve in any suitable manner, and carrying on one of its sides feed-rolls L R, arranged to revolve thereon, said rolls having gear-wheels arranged to engage with a gear independent of the shaft of said disk, for the purpose specified.

In testimony whereof we have hereunto set our hands in the presence of two subscribing witnesses.

ORRIN BRYANT.
ELKANAH RING.

Witnesses:
J. B. PIERCE,
W. I. BURGHAULT.